Aug. 18, 1936.  J. P. CALLAHAN  2,051,365
SIDE WING CONSTRUCTION
Filed May 25, 1935  2 Sheets-Sheet 1
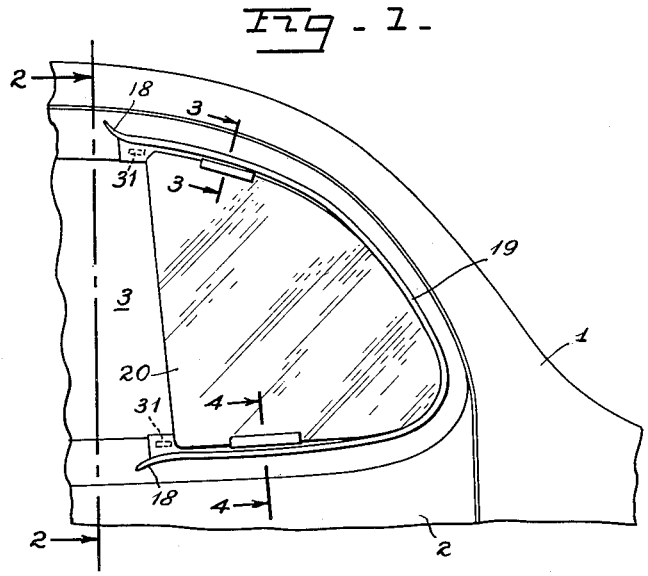
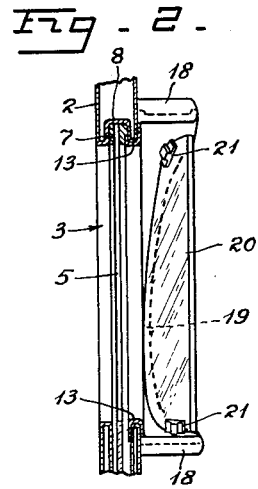
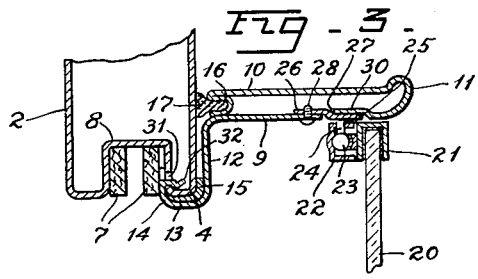
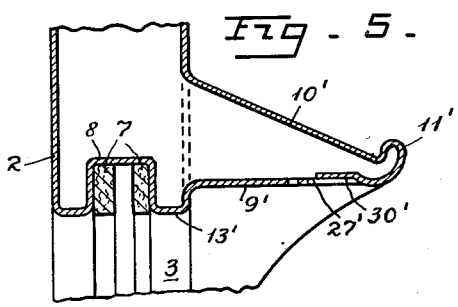
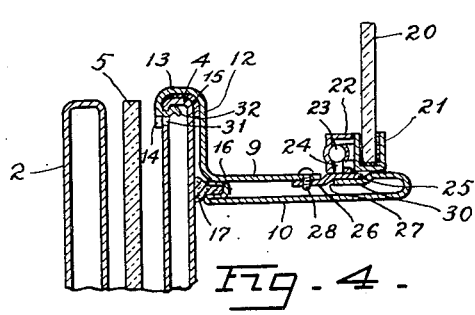
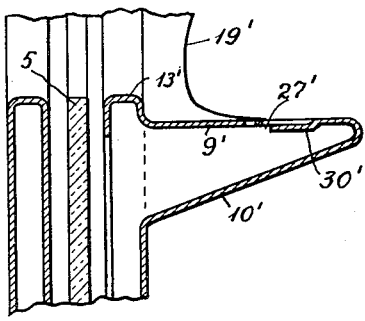
INVENTOR.
JAMES P. CALLAHAN
BY Miller Boyken &Bried
ATTORNEYS Aug. 18, 1936.     J. P. CALLAHAN     2,051,365
SIDE WING CONSTRUCTION
Filed May 25, 1935     2 Sheets-Sheet 2

INVENTOR
JAMES P. CALLAHAN
BY
ATTORNEYS

Patented Aug. 18, 1936

2,051,365

UNITED STATES PATENT OFFICE 2,051,365

SIDE WING CONSTRUCTION

James P. Callahan, San Francisco, Calif.

Application May 25, 1935, Serial No. 23,427

16 Claims. (Cl. 296—84)

This invention relates to wind deflectors for use on automobiles which deflectors are ordinarily known as "side wings", and the objects of this invention are; to provide an improved construction in such side wings for insuring against ingress of rain, wind, sleet or the like into an automobile window opening when the glass of the window opening is down; to provide a structure that is readily adaptable to being formed as one of the steps of forming the automobile door having a window opening or which structure may be made separately from the door and later installed. Other objects will appear in the following specification and drawings.

In the drawings, Fig. 1 is a side view of a portion of an automobile at a front door window opening showing one of the forms of my side wing in position.

Fig. 2 is a rear view of the side wing of Fig. 1 showing part of the automobile in cross section.

Fig. 3 is an enlarged sectional view of a portion of Fig. 1 as seen from the line 3—3 of Fig. 1, the wing ball pivot being show in elevation.

Fig. 4 is an enlarged sectional view of a portion of Fig. 1 as seen from the line 4—4 of Fig. 1, the wing ball pivot being shown in elevation.

Fig. 5 is an enlarged sectional view of a portion of an automobile body taken generally along the same lines as 3—3 and 4—4 of Fig. 1, only with the automobile door itself forming the mounting for the side wing.

Figure 6:
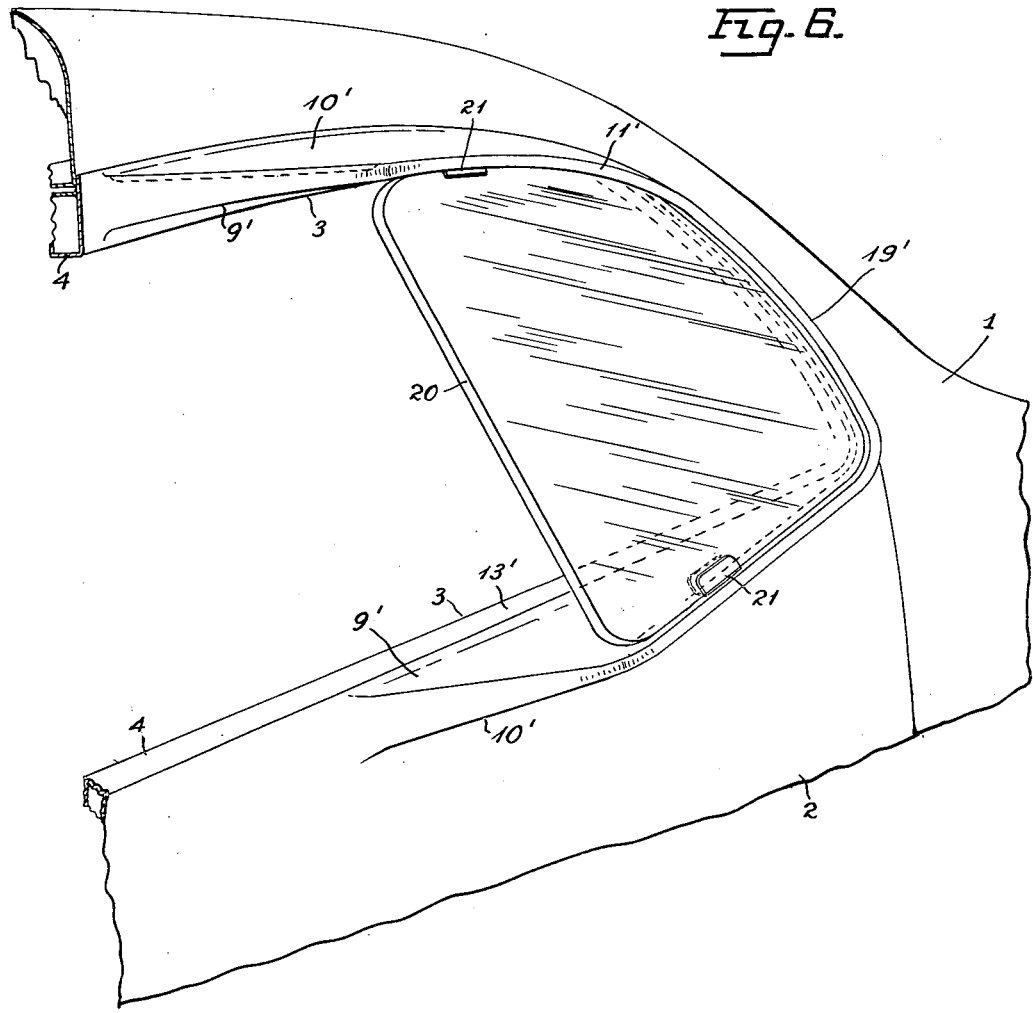
Fig. 6 is a perspective view of the form of wing mounting as shown in Fig. 5, but with the side wing in position, and the outer wall only of the automobile body being shown in section.

In detail 1 represents a portion of the body of an automobile, 2 the door, 3 the door window opening, 4 the reveal of the door window opening to the outer side of the sliding glass 5 of the door, and 7 is a felt strip in a channel 8 of the edge of the window opening adjacent the inner side of that portion of the door to the outer side of the sliding glass.

The form of side wing shown in Figs. 1 to 4 comprises an elongated strip of flat sheet metal bent longitudinally on itself, to form spaced opposed walls 9, 10, a rounded edge 11 along the line of the bend and which strip thus formed is then bowed or shaped in the direction of its length to form a generally U-shaped frame in which wall 9 forms the inner side of the frame and wall 10 the outer side, thus the walls 9, 10, will be referred to as "inner" and "outer" walls respectively. The rounded edge 11 is positioned at a point spaced outwardly of the outer side of the automobile when in position, hence will be referred to as the "outer" edge of the frame and the free edges of the walls 9, 10, which are opposite the edge 11, will be referred to as "inner" edges.

The frame comprising the walls 9, 10, while generally U-shaped, is more specifically of a shape to substantially conform to the outline defined by the edges of the forward portion of the automobile door window opening in what are ordinarily called "streamlined" automobiles as indicated in Fig. 1, but the outline defined by wall 9 is slightly larger than the outline defined by the door window opening for a purpose later described. The walls 9 and 10 are disposed in planes extending transversely of the plane of the window opening.

The inner wall 9 is bent inwardly adjacent its inner edge as at 12 to substantially follow the cross sectional contour of the reveal of the window opening to the outer side of the sliding glass, and is then shaped to lie transversely across the reveal at 13 and a short distance down the inner side of the window opening adjacent the edge thereof at 14. This construction, as seen, provides an outwardly opening channel around the frame adjacent the inner edge of the inner wall of the frame, which channel is adapted to receive the reveal of that portion of the window opening to the outer side of the sliding glass of the door. The portion 14 is adapted to fit between the felt strip 7 and the inner side of reveal 4, and a soft strip of rubber or felt 15 is interposed between the channel thus formed and the reveal of the door to prevent marring the reveal and also to aid in spacing the portion 12 from the outer side of the door.

The inner edge of the outer wall 10 is bent to form a channel 16, which channel opens outwardly toward the side of the automobile at a point spaced outwardly from the edge of the window opening. In this channel 16 is a strip of soft rubber 17, such as sponge rubber, or tubing, or any such material having good resiliency. This rubber strip is adapted to engage the outer side of the automobile door all around the frame and not only spaces the inner edges of walls 9, 10, from the side of the automobile, but forms a tight seal between the frame and side of the automobile along the frame. The channel 16 is formed to lie between walls 9, 10, and may be secured to wall 9. In this position the channel is concealed thus the appearance of the frame is neat and appears to be formed as part of the automobile.

The outer edge 11 of the frame is upwardly turned and extends rearwardly divergently outwardly from the forward edge of the window opening, the upwardly turned portion terminating adjacent the lower forward corner of the window opening where it gradually tapers out to blend with the portion extending along the lower edge of the opening as seen in Fig. 4. The rear edges of the upper and lower portions of the frame are outwardly and oppositely turned as seen in Fig. 1 at 18, thus any wind, rain, sleet, or the like striking the frame as the automobile moves forwardly is deflected outwardly away from the window opening, and the out turned edge 11 co-acts with the side of the door to form a sort of channel or drain along the upper and forward portions of the frame. It is to be noted that the forward portion of the frame 19 projecting outwardly from the side of the automobile is relatively narrow so as not to obstruct vision.

Within this frame, as described, is the glass shield 20, and the upper, forward and lower edges of the shield, including the upper and lower forward corners, conform in outline to the outline defined by the inner side 9 of the frame.

Secured to the upper and lower edges of shield 20 are short U-shaped brackets 21 adapted to embrace the edges of the shield and secured to the inner side of each bracket is a box-like member 22 provided with a socket therein for frictionally gripping a ball 23. Ball 23 has an outwardly extending shaft 24 secured at its outer end to a plate 25, which plate is slightly bent adjacent connection of the shaft and plate to form an offset portion on the plate as at 26 adapted to extend through a slot 27 in inner side wall 9 of the frame so as to lie under a portion of said inner side wall, and a screw 28 through the inner side wall 9 to threadedly engage portion 26 for firmly securing the offset portion 26 to the frame. The inner side 9 of the frame is likewise shaped at 30 to provide a seat for the portion of the plate carrying the ball whereby the bracket 21 will be brought close to the inner side wall 9 of the frame, and thereby provide a substantially close fit between the edges of the shield 20 and the frame.

The construction of the box-like member that carries the socket and its manner of securement to the U-shaped bracket 21 is similar to that shown in my Patent No. 1,980,976, November 20, 1934 and in my co-pending application for a patent Ser. No. 14,773 filed April 5, 1935.

The plates 25 and the ball and socket joints connecting the shield 20 to the frame are disposed adjacent the outer edge 11 of the frame at the upper and lower portions of said frame, thus when the forward edge of the shield is disposed behind the forward narrow edge of the frame, the shield extends divergently rearwardly from the outer side of the door in which position the rain, wind and the like will be deflected outwardly by the shield away from the window opening.

In the foregoing described construction it is seen that the portion 13 of the frame defines a portion of the edge of the window opening, and the margins of the shield 20 overlap the margins of the door at the edges of the window opening, thus making it impossible for the rain, etc., to enter the door window opening around the edges of the shield. Also the portion 12 of the frame forms an abutment for the forward edge of the shield, and the pivots for the shield are sufficiently tight to prevent any chattering or swinging of the shield except when the shield is manually turned.

The manner of attaching the frame to the door is similar to that shown and described in the co-pending application of Woodward, Serial No. 16,597 filed April 16, 1935, which application is assigned to me, in which the inner side of that portion of the door to the outer side of the sliding glass is provided with short horizontal slots 31 adjacent the edge of the window opening in which ears 32 formed on the portion 14 of the frame are adapted to snap and engage over the edges of the slots when the frame is slid forwardly to abut against the forward edge of the door reveal. The entire frame is of resilient sheet material, thus providing a spring fit in the door window opening and insuring a tight fit without danger of loosening, since the upper and lower portions of the frame adjacent the edge of the window opening normally tend to spring apart slightly and thus to force said portions against the reveal of the door.

In Figs. 5 and 6 the frame for the shield is pressed out of the door itself adjacent the edges of the door window opening, thus providing inner wall 9', and outer wall 10', said outer wall being inclined to facilitate forming the frame, and such construction also blends with the side of the automobile so as to be less noticeable. This construction provides all of the advantages of the construction shown in Figs. 1 to 5 inclusive, except that it is not removable. The shield overlaps the margin at the edge of the window opening, and there is a drain along the upper and forward portions of the frame the same as in the removable frame. The pivotal mounting for the shield and the shield itself are not shown in Fig. 5, being the same as in Figs. 3 and 4. The rear edges of the frame of Figs. 5 and 6 are outwardly formed as at 18'. All parts similar to those shown in Figs. 1 to 5 are numbered the same, only primed. It will be noted that the portion 13' is the reveal of the door itself.

Where the term "frame" is used in the claims it is intended to refer to the frame mounting the glass shield whether formed integrally with the body or removable therefrom, except where the construction as defined obviously refers to the removable construction.

Having described my invention, I claim:

1. In an automobile body having a generally vertical side wall and a window opening therein fitted with sliding glass, a generally vertically disposed glass shield extending across the forward portion of said window opening, a supporting frame on the body for said shield, said supporting frame including a portion extending along the lower edge of the window opening and projecting outwardly of the generally vertical side of the body, said portion comprising a pair of vertically spaced walls disposed respectively in planes extending transversely of the plane of the window opening and connected along their outer edges.

2. In a construction as defined in claim 1, the upper wall of said vertically spaced walls being disposed below the lower edge of the window opening.

3. In a combination as defined in claim 1, the upper wall of said vertically spaced walls being provided with a portion at its inner edge defining the outline of the lower edge of said window opening adjacent the forward edge of said opening to the outer side of the sliding glass.

4. In a construction as defined in claim 1, the upper wall of said vertically spaced walls being provided with a portion defining the lower edge of said window opening adjacent the forward edge of said opening to the outer side of the sliding glass, said portion continuing around the lower forward corner and upwardly along the forward edge of said opening and defining the lower forward corner and forward edge of the opening to the outer side of the sliding glass, and a plate adjacent the upper edge of the opening projecting outwardly of the generally vertical side of the body at the upper edge of the window opening, said shield secured top and bottom to said plate and to the upper wall of the said spaced walls at the lower edge of the window opening respectively at points spaced outwardly from the edge of the window opening.

5. In an automobile body having a generally vertical side wall and a window opening therein fitted with sliding glass, a generally vertically disposed glass shield extending across the forward portion of said window opening, a supporting frame on the body for said shield, said supporting frame including a portion extending along the upper edge of the window opening and projecting outwardly of the generally vertical side of the body, said portion comprising a pair of vertically spaced walls disposed respectively in planes extending transversely of the plane of the window opening and connected along their outer edges.

6. A side wing for an automobile door window opening fitted with sliding glass comprising a vertically disposed glass shield, a continuous frame adapted to extend along the upper, lower and forward edges of said shield, said frame comprising an elongated strip of flat sheet metal bent longitudinally thereof to form inner and outer opposed walls connected along the line of the bend and the opposite edges being free, said walls being disposed respectively in planes extending transversely of the plane of the shield and the inner wall being provided with means along its free edge adapted to engage over the edge of the window opening to the outer side of the sliding glass, and the free edge of the outer wall being provided with a sealing strip adapted to form a sealing contact with the outer side of the automobile door adjacent the edge of the window opening, means securing the shield to said frame with its upper, lower and forward edges in substantial engagement with said inner wall.

7. In a construction as defined in claim 6, the means on the inner wall adapted to engage the edge of the window opening comprising an outwardly opening elongated channel member connected along one of its free edges to the inner edge of the inner wall, and means on said channel member adapted to removably engage the door adjacent the edge of the door window opening.

8. In a construction as defined in claim 6, said frame being turned upwardly along its rounded outer edge along that portion of the frame adapted to extend along the upper edge of the shield.

9. In a side wing for an automobile including a glass shield adapted to be positioned vertically across the forward portion of a window opening in the automobile body, a frame for supporting the shield in the aforesaid position comprising a continuous elongated strip of metal extending along one elongated edge over the upper and lower edges of the shield and the opposite elongated edge extending horizontally over the upper, lower and forward edges of the window opening, said strip being formed adjacent said opposite elongated edge to generally conform to the cross-sectional contour of the body at the upper and lower edges of the window opening whereby a portion of the strip along said upper and lower edges of the window opening is adapted to extend generally vertically over the outer vertical sides of the body at the edges of the opening and a strip of relatively soft resilient material disposed between the outer vertical side of the body and the portion of the frame extending vertically thereover, and said shield being pivoted top and bottom to the strip for pivoting relative thereto on a generally vertical axis.

10. In combination with an automobile door having a generally vertical main outer wall of sheet metal formed with a window opening therein and a door window glass fitted within the door for raising and lowering to substantially cover and uncover the entire window opening, said metal wall being pressed outwardly along the upper edge of the window opening to form a horizontally extending hollow ledge of progressively increasing horizontal width from a point adjacent the forward edge of the opening rearwardly, a substantially vertically disposed glass shield positioned with its forward edge adjacent the forward edge of the window opening and adjacent the forward edge of the door window glass but spaced outwardly from the forward edge of the door window glass and the upper edge of the shield extending below and adjacent the outer edge of said ledge and substantially parallel therewith, a pivot at the upper edge of the shield and a pivot at the lower edge of the shield connecting the shield to said wall of the door adjacent the upper and lower edges of the window opening respectively, each pivot being positioned intermediate the forward and rear edges of the shield and adapted for pivoting the shield on a generally vertical axis whereby the forward edge of the shield will swing to a position outwardly of the outer wall of the door and in a direction away from the forward edge of the door window glass, said upper pivot being positioned adjacent the outer edge of said ledge and connecting therewith.

11. In a construction as defined in claim 10, the door wall being pressed outwardly along the lower edge of the window opening to form a hollow horizontally extending lower ledge of progressively increasing horizontal width from a point adjacent the forward edge of the opening rearwardly, and the lower edge of the shield extending along the outer edge of said lower ledge, said pivot at the lower edge of the shield connecting between the lower edge of the glass and the lower ledge.

12. In an automobile door including a generally vertical main outer wall of sheet metal formed with a window opening therein, said wall being pressed outwardly adjacent the upper and lower edges of the opening to form opposed horizontally elongated hollow ledges extending from the forward edge of the opening rearwardly, and the inner opposed sides only of said ledges being formed for securing pivot means thereto for supporting a substantially vertical shield of glass positioned between said ledges and pivot means at the upper and lower edges of the glass secured to the inner opposed sides of said ledges respectively.

13. In a side wing for an automobile including a glass shield adapted to be positioned vertically across the forward portion of a window opening in the body of the automobile with its upper, lower and forward margins in overlapping relation to the margins of the body adjacent the upper, lower and forward edges of the window opening, a frame for supporting said shield top and bottom, said frame comprising an elongated strip of metal extending across the upper, lower and forward edges of said shield and formed with an outwardly opening elongated channel adapted to engage over the upper, lower and forward edges of the window opening.

14. In an automobile door including a generally vertical main outer wall of sheet metal formed with a window opening therein, said wall being pressed outwardly adjacent the upper edge of the opening to form a horizontally elongated hollow ledge extending from the forward edge of the opening rearwardly, the lower wall of said ledge and the wall of the body adjacent the lower edge of the opening respectively being formed for securing separate pivot means thereto for pivotally supporting a substantially vertical shield of glass therebetween.

15. In an automobile door including a generally vertical main outer wall of the sheet metal formed with a window opening therein, said wall being pressed outwardly adjacent the lower edge of the opening to form a horizontally elongated hollow ledge extending from the forward edge of the opening rearwardly, the upper wall of said ledge and the wall of the body adjacent the upper edge of the opening respectively being formed for securing separate pivot means thereto for pivotally supporting a substantially vertical shield of glass therebetween.

16. In a side wing for an automobile including a generally vertical automobile body wall of sheet metal having a window opening formed therein, a glass shield positioned to extend generally vertically across the forward portion of said opening with its lower and forward margins disposed in overlapping relation to the margins of the body at the lower and forward edges of the window opening, an elongated metal strip integral with the metal of the body disposed over the upper, lower, and forward edges of the shield along one of the longitudinally extending edges of the strip and the margin of the strip along the opposite longitudinally extending edge thereof defining the upper, forward and lower edges of that portion of the window opening lying within the opening inwardly of the generally vertical plane of the outer surface of the body wall, means pivotally securing the shield top and bottom to said strip positioned for swinging the forward edge of the shield to and from a position behind said strip.

JAMES P. CALLAHAN.